J. RIPCZINSKE.
PNEUMATIC COW MILKER APPARATUS.
APPLICATION FILED FEB. 9, 1911.
1,008,369.
Patented Nov. 14, 1911.
3 SHEETS—SHEET 2.
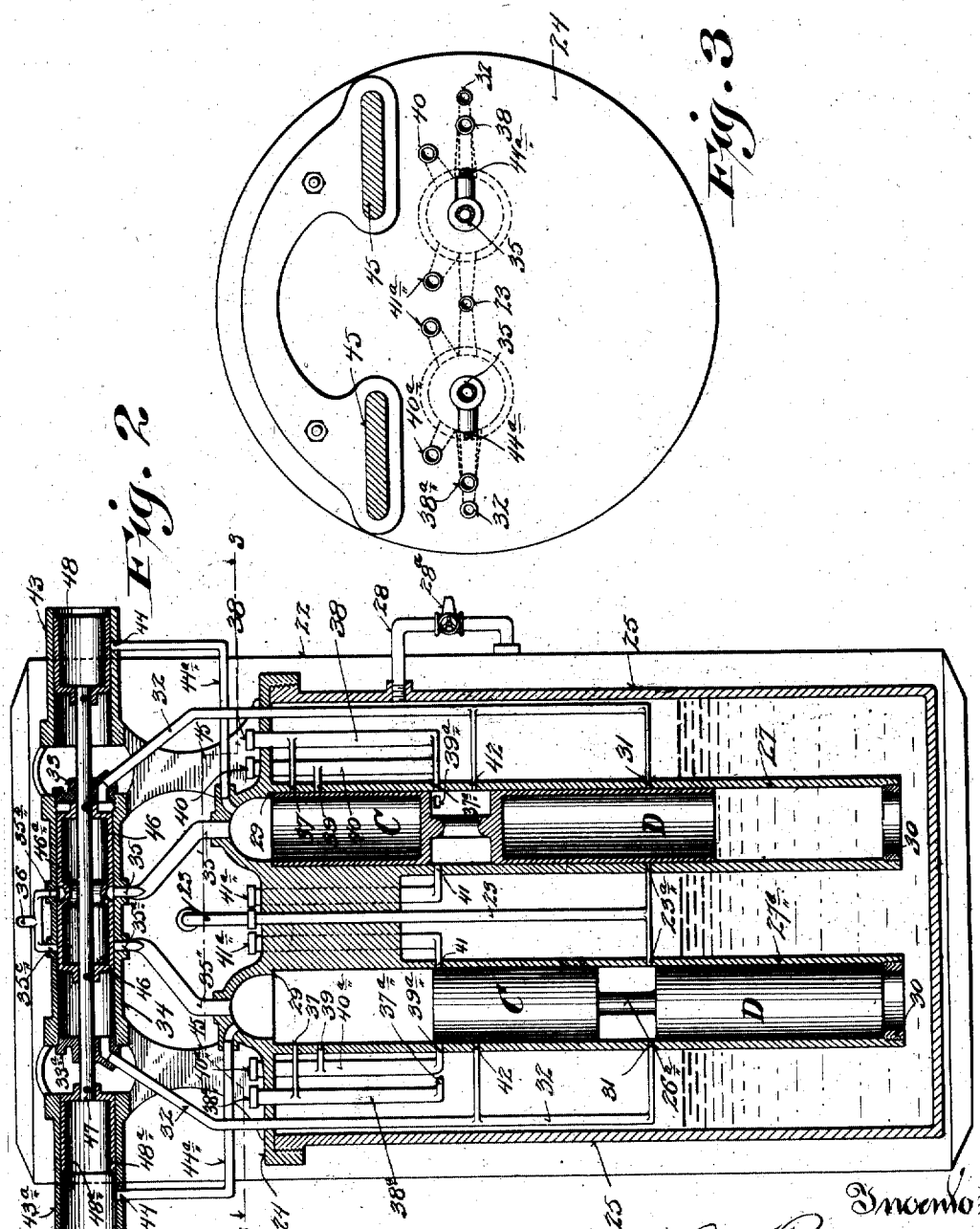

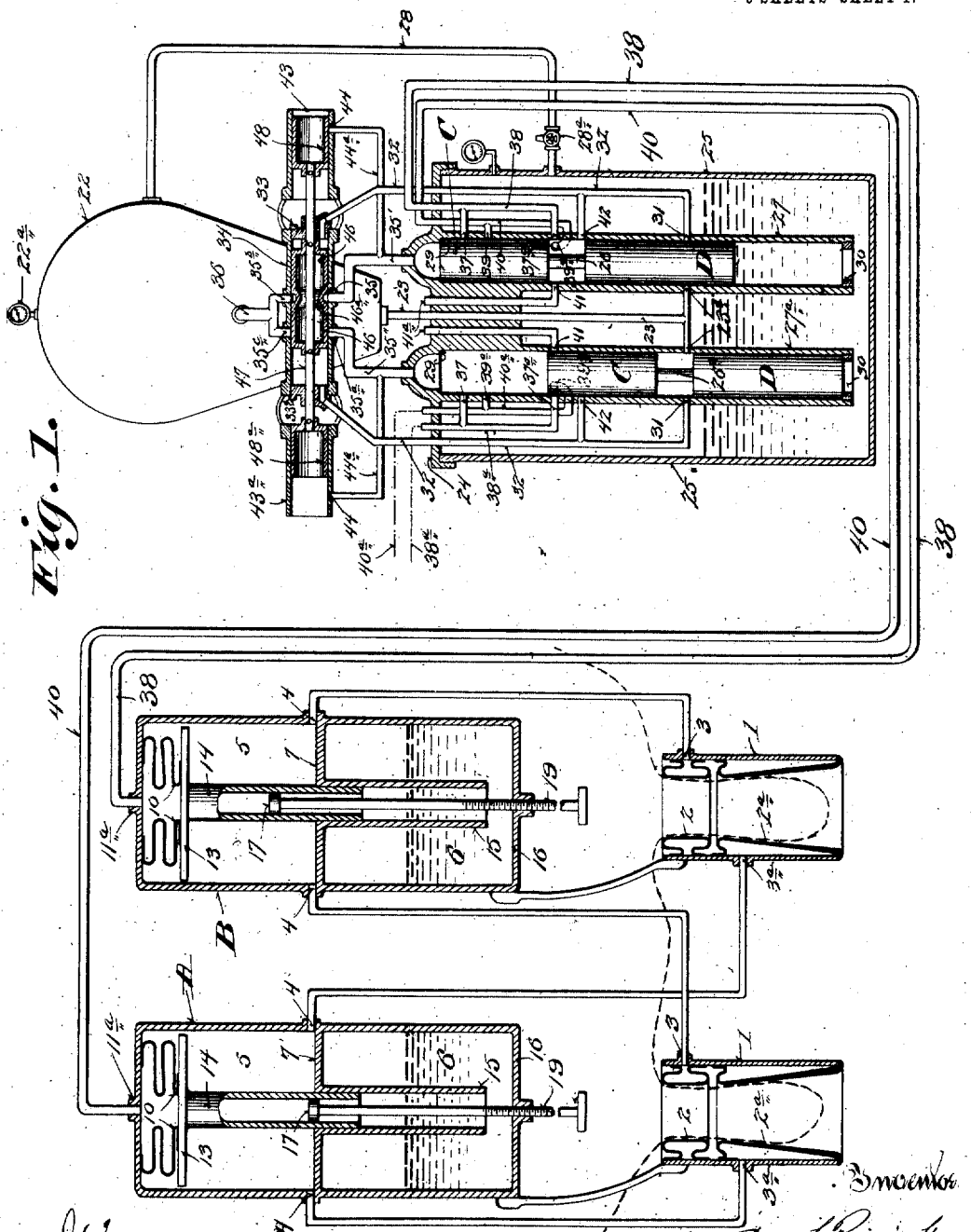

J. RIPCZINSKE.
PNEUMATIC COW MILKER APPARATUS.
APPLICATION FILED FEB. 9, 1911.
1,008,369.
Patented Nov. 14, 1911.
3 SHEETS—SHEET 3.
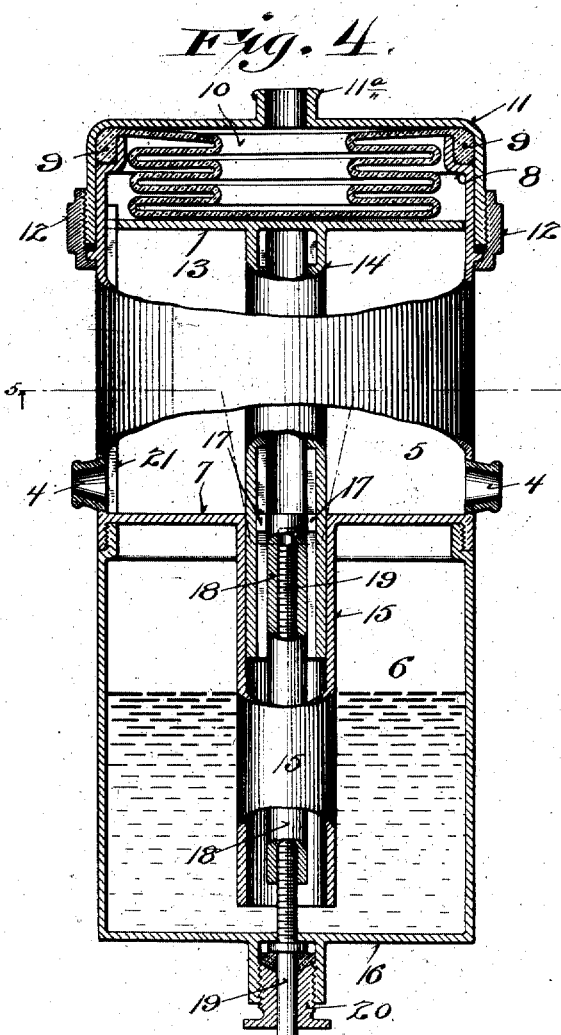
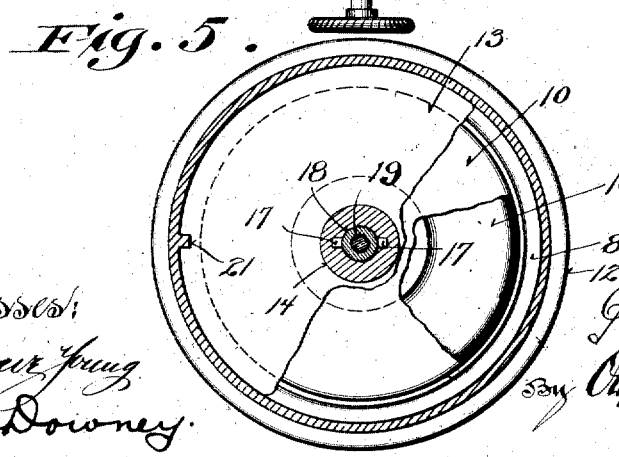

UNITED STATES PATENT OFFICE.

JOSEPH RIPCZINSKE, OF WAUSAU, WISCONSIN.

PNEUMATIC COW-MILKER APPARATUS.

1,008,369.
Specification of Letters Patent. Patented Nov. 14, 1911.
Application filed February 3, 1911. Serial No. 607,547.

*To all whom it may concern:*

Be it known that I, JOSEPH RIPCZINSKE, a citizen of the United States, and resident of Wausau, in the county of Marathon and State of Wisconsin, have invented certain new and useful Improvements in Pneumatic Cow-Milker Apparatus; and I do hereby declare that the following is a full, clear, and exact description thereof.

My invention in a general way refers to pneumatic cow-milkers wherein the milking is effected by a series of pulsations imparted to one or more membraneous lined shells, which membranes act directly upon the teat to expel the milk therefrom.

The primary object of my invention is to provide simple, durable, sanitary and positive means for the automatic control and distribution of compressed air to membraneous lined teat-shells, said invention being particularly applicable to that form of teat-shell wherein the membraneous lining is divided into upper and lower cells, the upper one of which, when expanded, will choke the teat at its base, whereby the milk contained therein is cut off from the udder. The lower membrane thereafter expels the milk by pressure that is exerted in a gradual downward wave starting from the point of cut-off.

A structure capable of performing the above functions is disclosed in an application for patent for improvements in pneumatic cow-milkers filed by me November 15, 1910, Serial No. 592,581.

The construction and arrangement of my present invention is such that by the interposition of a set of relay chambers or compressors in the air distribution system, the constant primary pressure will act only indirectly upon the cells of the teat-shell to impart a secondary pressure thereto that is capable of being varied from the pressure of the primary source, the secondary pressure being under adjustable control consistent with the cell area, whereby the desired expansion of said cell or cells is obtained to effect a milking operation, the volume and pressure being regulated in accordance with the muscular resistance of the teat glands.

My present invention further contemplates the employment of an automatically actuated auxiliary valve that is interposed between a constant air pressure source of supply and a master valve with which it coacts to direct charges of air admitted to and exhausted from the teat-actuating mechanism in successive impulses.

From the foregoing brief synopsis of my invention it will be understood that each teat-shell may be supplied with air varying in pressure and regulated to perform the necessary function whereby injurious strain upon the teat is thus overcome. The primary factor that heretofore caused pneumatic cow-milkers to be impractical being due to the fact that teats vary in sensitiveness in a greater or less degree in proportion to their muscular development. Consequently the pressure required to expel the milk from one teat or set may be entirely inadequate or out of proportion to that required for another. Hence cow-milkers of the general type referred to have been condemned as impractical by dairymen, the overstrain exerted upon the teats causing the fine milk glands to become strained and inert and functionally incapable of contraction whereby the milk glands, when filled, in numbers of instances have been known to continually drip or flow.

With the above objects in view my invention consists in certain peculiarities of construction and combination of parts as hereinafter set forth with reference to the accompanying drawings and subsequently claimed.

In the drawings Figure 1 represents a diagrammatic sectional view of a pneumatic milking apparatus embodying the features of my invention; Fig. 2, a detail longitudinal sectional elevation of a master valve mechanism and attached auxiliary valve, an air reservoir being illustrated rearwardly thereof; Fig. 3, a detail sectional plan view of the master valve mechanism, the section being indicated by line 3—3 of Fig. 2; Fig. 4, a longitudinal sectional view of a relay chamber, sets of which are adapted to perform the function of air compressors that discharge into the teat-shells, the said relay chambers being placed in juxtaposition to the shells, and Fig. 5, a cross-section of the same as indicated by line 5—5 of Fig. 4, parts being broken away to more clearly illustrate certain structural features.

Referring by characters to the drawings with especial reference to the diagram, 1 indicates a pair of teat-shells, each of which is provided with a membraneous lining comprising upper and lower cells 2, 2ª respectively. The upper cell 2 is preferably molded in the form of a ring having oppositely disposed inwardly extended folds, the terminals of which are secured to the cell body, which body has an air port 3 that communicates with the cell. The lower cell 2ª of each shell is tubular in form, the walls of which are gradually decreased in thickness from bottom to top and the top edge is merged into a fold similar to that described in connection with the upper cell. The shells are also each provided with an air port 3ª that communicates with the lower cells 2ª.

It should be understood that, in practice, each milking apparatus is preferably provided with two sets of shells such as shown in the diagram, the sets being mounted upon a suitable frame (not shown) that is suspended by a harness in any desired manner from the cow, this mechanism forming no part of my invention.

In juxtaposition to each set of shells and supported by the frame (not shown) are a pair of relay chambers or air compressors A, B, and, as shown in Figs. 3 and 4, each chamber comprises a cylinder in separable sections, the sections being divided into upper and lower compartments 5 and 6 respectively by an intermediate partition 7, which partition, in this instance, is shown integral with the upper section. The upper section of each cylinder terminates with an offset seat 8 for the reception of the beaded end 9 of an elastic diaphragm 10 that is in the form of a bellows-like cup. The beaded end of the diaphragm is held to its seat by a cap 11, the same being secured to the cylindrical section by a coupling ring 12 carried thereby, with which ring the cap is in threaded union. The bottom wall of the diaphragm 10 rests upon a piston-head 13 loosely mounted within the upper compartment 5 of the cylinder, there being a hollow piston rod 14 extending from the underside of the piston-head, which piston is guided in a sleeve 15 that depends from the partition 7 and terminates with an open mouth disposed slightly above the bottom 16 of the lower compartment 6. The aperture in the piston rod 14 has the contour of a key-hole slot for the reception of a winged head 17 of a tubular stem 18 that is threaded for engagement with an adjusting screw 19, the shank portion of which extends through a gland 20 that is carried by the bottom 16, the said shank terminating with a knurled button whereby the screw is rotated for adjusting the head 17 up or down.

It is apparent that when the screw is rotated the winged head of stem 18 can be raised or lowered, the same being held against rotation owing to its non-rotary engagement with the key-hole slot of the hollow piston rod, while the latter, together with the piston-head, is locked against twisting by a spline 21 that extends from the side of the upper cylindrical section and engages a notch in the circular edge of said piston-head. Thus the stem 18 may be raised or lowered, whereby the position of its head 17 relative to the end face of the piston-head 13 is changed to limit the downward movement of the piston-head, which head engages the winged head 17 of said screw and is thereby stopped. The cap 11 of the upper cylindrical section is provided with a port 11ª that communicates with the diaphragm 10, while the upper chamber 5 is also provided with air ports 4 adjacent to the partition 7 thereof. The mouth of the lower cylindrical section is in threaded union with the bottom terminal of the upper section and prior to attaching the lower section which forms the chamber 6, the latter is partly filled with oil or other suitable liquid to form a seal, it being understood that when the lower section is screwed into place, a slight compression of the air contained therein is obtained. This slight elastic cushion acting upon the hollow piston 15 is sufficient, in conjunction with the natural contractibility of the diaphragm to return the piston-head to its normal position after the same has been depressed in performing its function as a compressor.

In my present invention it is proposed to utilize an approximately constant pressure of air or other elastic fluid as the medium of power, and with this in view, as shown in Fig. 2, an air storage reservoir 22 is provided, the same being supplied with air that is maintained at a predetermined pressure irrespective of its consumption, and, for convenience in determining this pressure, the reservoir is equipped, as shown in the diagram, with an indicator gage 22ª. The reservoir supplies air to a master valve mechanism through a pipe connection 23, which pipe extends through the head 24 of a cup 25, the head in conjunction with the cup constituting a dash-pot, into which is arranged a pair of floating pistons 26, 26ª having upper and lower heads C, D, respectively, in stem connection, whereby an air space is formed therebetween. The pistons are guided in cylinders 27, 27ª, respectively, having open lower ends that terminate above the dash-pot bottom, the said cylinders being provided with a series of air ports, communication between certain of which is established through the air space between the upper and lower heads of the pistons, the said ports being more particularly described hereinafter. The dash-pot is partially filled with oil to more effectually seal the lower open ends of the cylinders and is also supplied with a charge of air at a pressure that is slightly below that of the primary pressure maintained in the reservoir, which pressure, for example, is twelve pounds, while that maintained within the dash-pot is eleven and a half, and for convenience, as shown in the diagram, the supply of air to said dash-pot is received from the reservoir by a pipe 28 that is provided with a three-way valve 28ª, there being a gage in connection with the dash-pot for indicating the air pressure therein. Hence, for reasons to be hereinafter stated, should it be desired to raise or lower the pressure in the dash-pot with respect to the primary pressure of air, it may be accomplished by operating the valve 28ª, whereby the same can be opened to exhaust air from the dash-pot, or the same may be moved in another position to admit air thereto from the reservoir.

Each dash-pot cylinder is closed at its upper end and provided with a shoulder 29, whereby upward movement of the pistons are checked, the downward movement thereof being limited by collars 30 that are in threaded engagement with the mouths of the cylinders. As shown in the drawings, the dash-pot piston 26ª is at the limit of its downward movement and when either of the pistons are in this position the upper end of the lower piston head D exposes a pair of air ports 31 and 23ª respectively that are horizontally alined with each other and formed in the cylinders. The ports 23ª are connected to branches of the air intake pipe 23 that leads from the reservoir and the ports 31 are connected by pipes 32 to heads 33, 33ª of a horizontally disposed cylinder 34 that constitutes part of an auxiliary valve mechanism. Upon opposite sides of the longitudinal center of the cylinder 34 are a pair of ports 35, 35ª, the port 35 being connected by a pipe 35' to the closed head of the dash-pot cylinder 27, the opposite port 35ª being similarly connected to the dash-pot cylinder 27ª by a pipe 35''. A second pair of ports 35ᵇ, 35ᶜ, are formed in the auxiliary valve cylinder 34, which ports are alined with the ports 35, 35ª, being connected by a branched pipe 36 that communicates directly with the reservoir 22.

Each dash-pot cylinder is provided with an air-port 37 spaced a slight distance below its shoulder 29, and a second port 37ª disposed at such distance below the first as to be closed by the upper dash-pot heads C when the latter are at the limit of their downward stroke, the ports 37ª being exposed when said piston-heads are in their reversed position, this being effected by the intermediate air space between the upper and lower piston heads. The ports 37 and 37ª are connected by branch-pipes to pipes 38 38ª, the pipe 38 being connected to port 11ª of the relay chamber or compressor B, as shown in the diagram, while the pipe 38ª is similarly connected to a relay chamber (not shown), which chamber constitutes a part of the second teat-operating mechanism. Another pair of ports 39, 39ª, are formed in each dash-pot cylinder, the ports 39 being disposed at a slight distance below the ports 37, while the ports 39ª are upon the same horizontal plane as the previously mentioned ports 37ª. Each set of these ports 39, 39ª, are also connected by branch-pipes to pipes 40, 40ª respectively, the pipe 40 being in communication with port 11ª of the relay chamber A as shown in the diagram.

The ports 37ª of pipes 38, 38ª and ports 39ª of pipes 40 and 40ª constitute exhausts through which communication is established to exhaust ports 41 of the cylinders when the pistons are at the limit of their upward movement, the exhaust ports 41 being connected to pipes 41ª that pass through the dash-pot heads and are open to atmosphere. The pipes 32 of the cylinder are also provided with branches, each of which is connected with an exhaust port 42, communication between which ports and the exhaust ports 41 is established when the pistons are at the limit of their upward movement.

The auxiliary valve cylinder 34 is provided with a pair of open end cylindrical extensions 43, 43ª, disposed opposite the heads 33, 33ª, which extensions have ports 44 that are connected by pipes 44ª to the dash-pot cylinders 27, 27ª, the pipes 44ª, for clearness in illustration in the diagram, being shown as branches of the pipes 35', 35''.

As shown in Fig. 2, the auxiliary valve cylinder 34 is supported by a bracket 45 that is suitably secured to the dash-pot head, whereby assemblage of the parts is facilitated and when access is desired to the dash-pot, the head being removed, all pipe connections will remain intact therewith together with the dash-pot cylinders. The horizontally disposed valve cylinder 34 carries a reciprocative valve 46 that is mounted upon a stem 47, which stem is guided in apertures provided in the heads 33, 33ª, the said stem being also provided with exhaust valves 48, 48ª that are mounted in the cylindrical extensions 43, 43ª respectively and control the exhaust ports 44 therein. The valve 46 is interrupted or annularly grooved intermediate of its ends to constitute an air chamber 46ª that alternately establishes communication between the pair of ports 35, 35ª and 35ᵇ, 35ᶜ, whereby air is admitted to the top of each dash-pot cylinder relative to the position of said valve. Valve 46, as shown, being horizontally disposed, is approximately balanced and hence will operate with the least possible friction and, if the valve be in the position as shown in the diagram, air will be admitted to the top of the dash-pot cylinder 27, the exhaust valve 48ᵃ at the same time permitting air to escape from the top of the opposite dash-pot cylinder 27ᵃ, whereby its piston 26ᵃ will be forced upwardly by the air compression maintained within the dash-pot exerting force upon the lower face of the piston-head D, it being understood that the auxiliary valve 46 was positively shifted to the position shown in the diagram by air from the reservoir that passed from pipes 23 and 32 to the cylinder head 33, communication being established from port 23ᵃ to port 31 of the dash-pot cylinder 27 by means of the air passage that is formed between the piston-heads. Hence it will be seen that the auxiliary valve is positively operated to shift by the air pressure from the reservoir incidental to the alternate strokes of the master valve mechanism and when said auxiliary valve changes its position, the reservoir pressure is directed into the top of one cylinder and simultaneously exhausted from the top of the opposite dash-pot cylinder, the exhaust being controlled by the exhaust valves 48, 48ᵃ. It should be also noted that, owing to the fact that the exhaust pipes 44ᵃ are of such restricted proportions, a slight back pressure is offered to prevent hammer of the pistons as they rise upon their exhaust stroke under the force of the expansive fluid within the dash-pot. Furthermore it should be observed that if the downward or working stroke of the pistons is too rapid, whereby the milking impulses follow too quickly the air pressure in the dash-pot may be increased slightly to retard said working stroke, which stroke under all conditions alternates with the upward or exhaust stroke of the opposite cylinder or vice versa.

Having described the apparatus in detail, the operation is as follows: The parts being in the position shown in the diagram communication is established between the reservoir and the top of dash-pot cylinder 27 due to the position of the auxiliary valve 46; the air pressure will cause piston 26 to move downward until its head C exposes port 37. The air pressure will thus immediately escape through said port and pipe 40 to the diaphragm 10 of the air compressor B and due to this sudden expansion of the air a slight retardation of the downward movement of the piston will result. The primary air pressure within the diaphragm 10 will now cause the same to be distended and the piston head 13 will move down and compress the air within the compartment 5, the said compressed air causing distention of the upper cells 2 in the pair of teat-shells, the said chamber 5 being in pipe connection therewith. This distention of the upper cells will be in proportion to the downward movement of the piston-head which is limited by engagement with the head 17, which, as shown in compressor B, is in such a position as to prevent the piston-head from completing its full stroke and hence the volume of air displaced from under the piston head is restricted, this restriction being due to the fact that the upper cell has proportionately less air capacity than the lower cell of the teat-shell and consequently the same will not be expanded above the desired degree. The two cells thus inflated will choke the teats therein close to the udder and cut off the supply of milk therefrom. Further movement of piston 26 opens port 39 to the air pressure, which port is in pipe connection with compressor A. The primary pressure that is distributed within the compressor causes a secondary pressure to enter the lower cells of the teat-shell and thus distend the same, whereby a positive grip of the teat directly under the upper cells is obtained with a gradual downward contractile movement, causing all of the milk to be expelled, this gradual contractile movement being due to the varying thickness of the walls of said lower cells. The piston 26 thereafter completes its downward stroke at a predetermined speed in proportion to the resistance offered in the dash-pot and when the limit of the downward or working stroke of said piston is completed communication between the cylinder ports 23ᵃ and 31 is established through the intermediate reduced portion of the piston. Air under pressure from the reservoir will then pass through pipe 23 and up through pipe 32 to the head 33 of the auxiliary valve mechanism. This positive pressure will then be exerted upon the end of valve 46 and immediately shift the same until it is stopped by the engagement of its opposite end with head 33ᵃ. Incidental to movement of the auxiliary valve 46 the exhaust section 48 of said valve will expose port 44 to the atmosphere. Thus the air pressure above the piston 26 is instantly relieved and the same will return to the position in which it is shown in the diagram; the said valve being cushioned against its seat 29 due to the fact that the pipe 44ᵃ is of slightly restricted area, whereby a slight back pressure upon the exhaust is had. Incidental to the completion of the upward or exhaust stroke of the piston, the exhaust ports 37ᵃ, 39ᵃ and 42 are all brought into communication with exhaust port 41 through the position of the intermediate reduced portion of the piston 26 and hence air which had previously been admitted to the auxiliary valve cylinder through head 33 is exhausted and simultaneous therewith exhaust of the air from the diaphragm in the compressors A, B, is effected through pipe 41ᵃ. Thus the primary air pressure in the cells of the teat-shells is relieved and the piston-heads 13 of said compressors will return to their normal position, as shown in the diagram, by the slight expansive force that is contained in the lower compartment 6 of each compressor, which expansion is exerted upon the piston-rods 14, the slight elasticity of the air that is exerted upon said piston-rods being assisted by the contractile tendency of the diaphragms 10 which are molded in their normal contracted position.

The operation of the piston in the dash-pot cylinder 27ª is similar to that just described, this piston being connected by pipes 38ª and 40ª to a set of teat-shells equipped similar to those shown in the diagram.

I claim:

1. A cow-milker comprising a membraneous lined shell, a pneumatically actuated air compressor in communication with the shell and in juxtaposition thereto, and mechanism for controlling movement of the compressor.

2. A cow-milker comprising a membraneous lined shell having upper and lower cells, an individual pneumatically actuated air compressor in communication with each cell of the shell lining, and mechanism for controlling movement of the compressors individually.

3. A cow-milker comprising a membraneous lined shell having upper and lower cells, a source of constant air pressure, an individual air compressor in communication with each cell of the shell lining, means for controlling movement of each compressor independently, a master valve mechanism in communication with the source of air supply and each compressor, and an automatically actuated auxiliary valve in communication with said source of air supply and master valve.

4. A pneumatic cow-milker apparatus comprising a membraneous lined shell, an air chamber in juxtaposition to the shell, a piston-head reciprocatively mounted in the chamber, means for regulating movement of the piston-head in one direction, an air storage reservoir in communication with the chamber upon one side of the piston head, means for controlling the admission of air from said reservoir to the chamber, and communicating means between the opposite side of the piston-head and shell-lining, whereby air from the chamber upon said opposite side of the piston is admitted to said shell lining incidental to the admission of air from the reservoir to the reverse side of the piston-head.

5. An air pressure controller for the membraneous lined teat-shell comprising a chamber in juxtaposition to the teat-shell, a reciprocative member therein, an air supply-pipe in communication with the chamber upon one side of the reciprocative member, a communicating means between the chamber and teat-shell upon the opposite side of said reciprocative member, and means for regulating movement of the aforesaid reciprocative member.

6. In a pneumatic cow-milker having an expansible cellular lined shell, and a primary source of air pressure; the combination of a compressor for each cell of the shell lining, each compressor comprising a chamber having a reciprocative member therein, means for regulating movement of each reciprocative member, a communicating means between each of the compressor chambers and primary source of air supply upon one and the same side of the respective reciprocative members, a direct individual communicating means between the opposite side of the aforesaid reciprocative members, and a cell of the shell lining whereby a secondary air pressure is admitted to each cell, and a manually actuated mechanism carried by each compressor for regulating the secondary air pressure.

7. An air pressure controller for membraneous lined teat-shells comprising a headed cylinder having a partition therein whereby the cylinder is divided into upper and lower compartments, a piston-head reciprocatively mounted in the upper compartment, a bellows-like elastic diaphragm interposed between the piston-head and upper head of the cylinder, the cylinder being provided with an air port that communicates with the diaphragm, and a second air port that is located in the upper compartment adjacent to the dividing partition between said compartments, an expansible fluid in the lower compartment, a sleeve depending from the partition having an open mouth terminating adjacent to the bottom head of the cylinder, a hollow piston-rod extending from the piston-head in slidable engagement with the sleeve, a stem in telescopic union with the hollow piston-rod, a gland carried by the bottom head of the cylinder, and an adjusting screw fitted through the gland in threaded engagement with the stem.

8. An air pressure controller for membraneous lined teat-shells comprising a headed cylinder, a reciprocative piston-head mounted in the cylinder having a piston-rod that is provided with a longitudinally disposed key-hole slot, a stem having a winged head fitted into the piston-rod slot, and a screw carried by the cylinder in threaded engagement with the stem.

9. In a pneumatic cow-milker apparatus having a pair of shells each provided with a membraneous lining dividing it into upper and lower cells, and an air storage reservoir; the combination of a master valve comprising a dash-pot having an elastic fluid therein, a pair of heated cylinders extending within the dash-pot, the cylinders being provided with open lower ends, an automatically actuated auxiliary valve comprising a headed cylinder having open end extensions, a valve reciprocative in the cylinder having an intermediate air passage therein, a stem carried by the valve extending through the cylinder heads, a port in each dash-pot cylinder upon a common plane, each being in communication with the air reservoir, a pair of ports in each dash-pot cylinder, one of each pair being upon the same plane as the aforesaid ports, each pair being in communication with one end of the auxiliary valve cylinder, alined pairs of ports in the auxiliary valve cylinder, between each pair of which communication is alternately established through the intermediate passage of the auxiliary valve, communicating means connecting one pair of the ports with the reservoir, communicating means connecting each port of the other pair with the head of a dash-pot cylinder, an exhaust port in each auxiliary valve cylinder extension, each port being in communication with a port in one of the dash-pot cylinders, an exhaust controlling valve mounted in each cylinder extension carried by the valve stem, an air receiving and exhaust port in each dash-pot cylinder, means in connection with one pair of the air-receiving and exhaust ports for controlling the admission and exhaust of air with relation to the upper cells of the pair of teat-shells, a second pair of receiving and exhaust ports in each dash-pot cylinder, means in connection with one of the last mentioned pairs of receiving and exhaust ports for controlling the admission and exhaust of air with relation to the lower cells of the teat-shells, the air-receiving ports of the upper cells being above the plane of the air receiving ports of the lower cells, the air exhaust ports of the upper and lower cells being upon a common plane, an exhaust port in each dash-pot cylinder upon approximately the same plane as the cell exhaust ports, the last mentioned exhaust ports being in communication with the atmosphere, and reciprocative pistons mounted in the dash-pot cylinders for controlling all ports therein, movement of which pistons coöperates with movement of the auxiliary valve mechanism.

10. A controlling mechanism for pneumatic cow-milkers comprising a dash-pot having an elastic fluid therein, a pair of cylinders extending into the dash-pot provided with open lower ends, groups of air exhaust and distributing ports in each dash-pot cylinder, alternately actuating pistons mounted in the cylinders for controlling the groups of ports, a source of air supply in communication with the dash-pot cylinders, and an automatic valve for controlling communication between the source of air supply and said dash-pot cylinders.

11. In a pneumatic cow-milker having a pair of membraneous lined teat-shells each provided with a membraneous lining dividing it into upper and lower cells, and a source of air pressure; the combination of a dash-pot having a constant air pressure therein, a pair of cylinders having open ends extending into the dash-pot, a floating piston mounted in each cylinder, communicating means between the top of the cylinders and source of air pressure, the air pressure in the dash-pot being arranged to oppose movement of said pistons in opposition to the air pressure above the pistons, an automatically actuated valve for controlling the air pressure admitted to the top of the cylinders, a pair of compressors in juxtaposition to said teat-shells, a communicating means between one of the compressors and upper cells of the teat-shells, a communicating means between the other compressor and the lower cells of the teat-shells, a pair of receiving and exhaust ports in each cylinder, means connecting one pair of the receiving and exhaust ports of a cylinder with one of the compressors, and means connecting the other pair of receiving and exhaust ports of the cylinder with the other compressor whereby the admission and discharge of air to the upper and lower cells of the pair of connected teat-shells is regulated.

12. An automatically controlled valve for pneumatic cow-milkers comprising a headed cylinder having a port at each end, and two sets of ports disposed intermediate of its ends, open end cylindrical extensions alined with the cylinder, each extension being provided with an air exhaust port, a stem journaled in the cylinder heads, and valve-shells carried by the stem for controlling the ports.

13. In a cow-milker having a pair of membraneous lined teat-shells, and a source of constant air pressure; the combination of a headed auxiliary valve cylinder provided with pairs of intermediate ports and with end ports, open end alined extensions carried by the valve cylinder provided with exhaust ports, a master valve comprising a dash-pot containing a liquid seal and constant air pressure above the same, a pair of cylinders carried by the dash-pot having open ends communicating therewith, communicating means between one of each pair of intermediate ports of the auxiliary valve cylinder and the upper end of one of the dash-pot cylinders, communicating means between the end ports of said auxiliary valve cylinder and dash-pot cylinders, a communicating means between the exhaust ports and each dash-pot cylinder, exhaust and receiving ports in the dash-pot cylinder, means connecting the exhaust and receiving ports and teat-shells, floating pistons mounted in said dash-pot cylinders adapted to control the air exhaust and receiving ports therein, a reciprocative stem mounted in the auxiliary cylinder and extending therethrough, and valves carried by the stem for controlling the ports in said auxiliary cylinder and its extensions.

14. A cow-milker comprising a membraneous lined shell, an air compressor, actuating means therefor, means for adjusting the stroke of the compressor and a communicating means connecting the compressor and shell lining whereby pulsations of air from the compressor are delivered to said shell.

In testimony that I claim the foregoing I have hereunto set my hand at Milwaukee in the county of Milwaukee and State of Wisconsin in the presence of two witnesses.

JOSEPH RIPCZINSKE.

Witnesses:
MAY DOWNEY,
GEO. W. YOUNG.